United States Patent [19]

Shain

[11] 4,435,918
[45] Mar. 13, 1984

[54] DECORATIVE FLOWER POT

[76] Inventor: Guey-Ji Shain, 113, Yu Miao Li, Miao Li Chen, Taiwan

[21] Appl. No.: 333,730

[22] Filed: Dec. 23, 1981

[51] Int. Cl.³ ............................................. A01G 25/00
[52] U.S. Cl. .......................................... 47/79; 47/66; 47/80
[58] Field of Search ................... 47/66, 69, 79, 80, 68, 47/71, 82, 83, 85

[56] References Cited

U.S. PATENT DOCUMENTS

| | | | |
|---|---|---|---|
| 2,113,888 | 4/1938 | Kaparin | 47/71 |
| 3,243,919 | 4/1966 | Carlson | 47/79 |
| 3,903,642 | 9/1975 | Yellin | 47/69 |
| 4,106,235 | 8/1978 | Smith | 47/66 |
| 4,236,351 | 12/1980 | Smith | 47/79 |

FOREIGN PATENT DOCUMENTS

| | | | |
|---|---|---|---|
| 2358 | of 1887 | United Kingdom | 47/80 |
| 226099 | 12/1924 | United Kingdom | 47/66 |

*Primary Examiner*—Edgar S. Burr
*Assistant Examiner*—David A. Wiecking
*Attorney, Agent, or Firm*—Armstrong, Nikaido, Marmelstein & Kubovcik

[57] ABSTRACT

This invention relates to a flower pot comprising an upper pot, a lower pot, with means that can regulate the water supply to the soil and a means that can adjust the exposed area of the soil to the air, thereby minimizing the unfavorable effect of the drastic changes of the weather.

2 Claims, 5 Drawing Figures

DECORATIVE FLOWER POT

BACKGROUND OF THIS INVENTION

The flower pot plays an important role in the growth of ornamental plants. Conventional flower pots, however, is not adapted well to the drastical changes of the weather. Too much rainfall makes the soil muddy, results in the poor aeration thereof, and causes the rot of the roots. In dry season, unless frequently watered, even hardy plants may die.

Accordingly, it is an important object of this invention to provide a flower pot having buffering function. To obviate and mitigate the drawbacks of conventional flower pots.

SUMMARY

This invention relates to a flower pot having buffering function to regulate water supply. It comprises an upper pot, a lower pot, a first water storing means as a two split-ring shaped reservoir, and a second water-storing means as a reservoir stand. The reservoir stand is provided with water conduit and has a top that defines a substantially flat yet discontinuous plateau that can be complementarily combined with a shield to cover the soil of the lower pot. The reservoir stand, which has an extent of water permeability can regulate the moisture of the soil.

Only partly exposed to the air, and with the rotatable shield on the reservoir stand, the rain-washed area is considerably reduced, therefore effectively preventing the undesired formation of muddy masses or pellets and enhancing the aeration and porosity of the soil. Since the soil is partly shaded, the temperature in the soil does not increase too high when the pot is exposed in the sunlight in summer. Likewise, the rate of heat loss is reduced in winter to maintain the soil temperature.

The drainage hole cover that covers the drainage hole of the lower pot is connected with a perforated column which vertically passes through the soil to communicate with the clearance of the bottom, thereby providing an air path from the soil. The surface of the column is densely provided with perforations which allow not only the entry of air but also the discharge of the excess water which would otherwise hamper the respiration of the roots.

Other objects and advantages of the present invention will become more apparent to those persons skilled in this art to which the present invention concerns from the following description taken in conjunction with the accompanying drawings, wherein:

DETAILED DESCRIPTION OF PREFERRED EMBODIMENT

Figure 1:
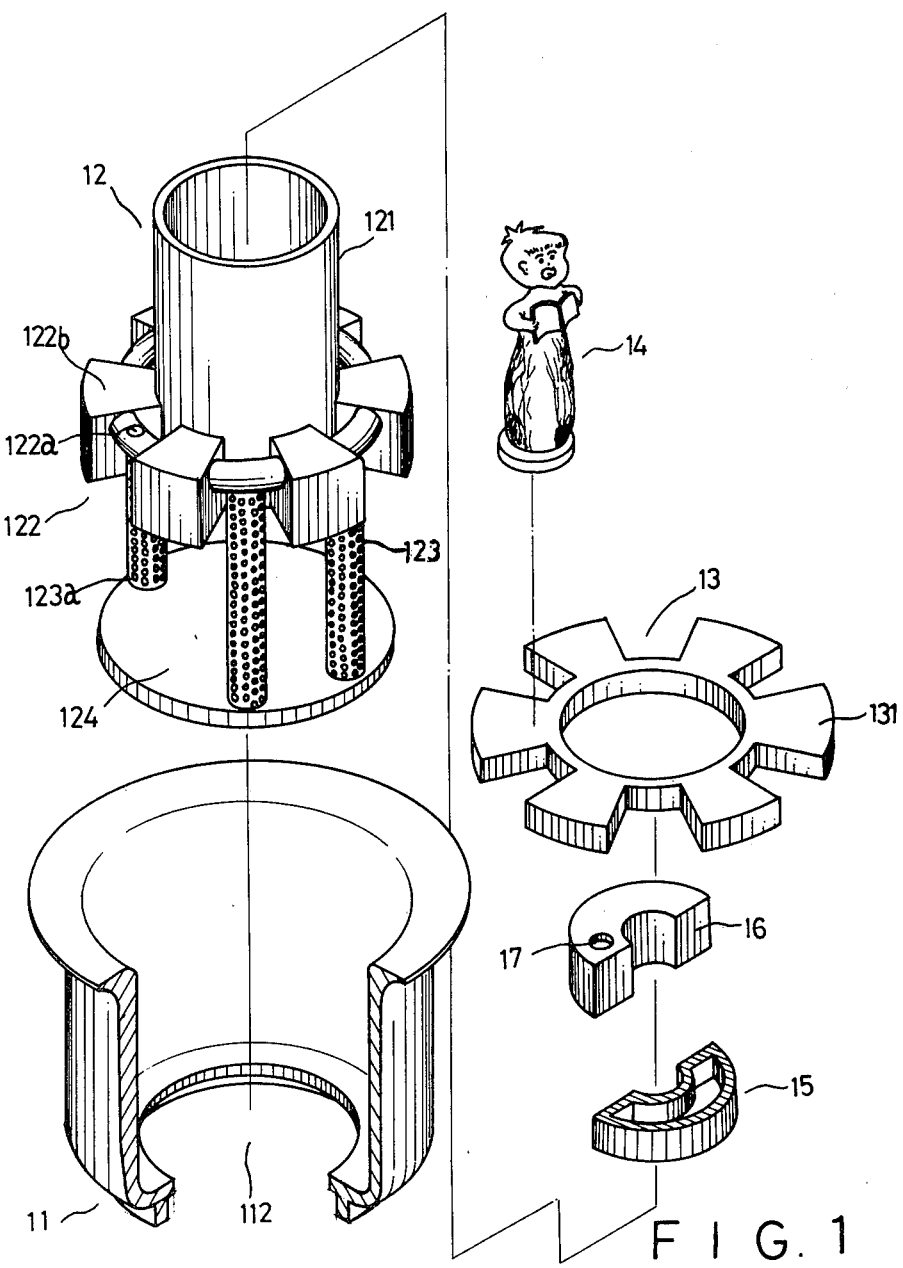
FIG. 1 is a fragmentary view of a preferred embodiment according to this invention.
Figure 3:
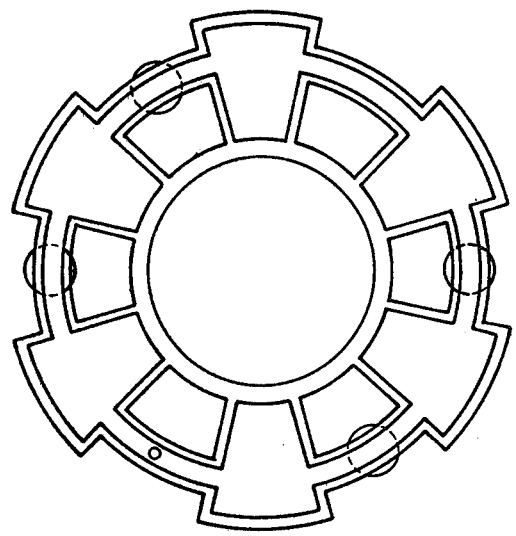
FIG. 3 is a plan view of this invention.
Figure 4:
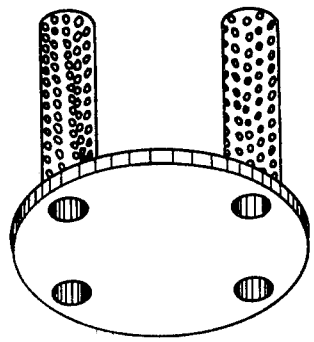
FIG. 4 is a view showing the bottom side of the drainage hole cover.
Figure 2:
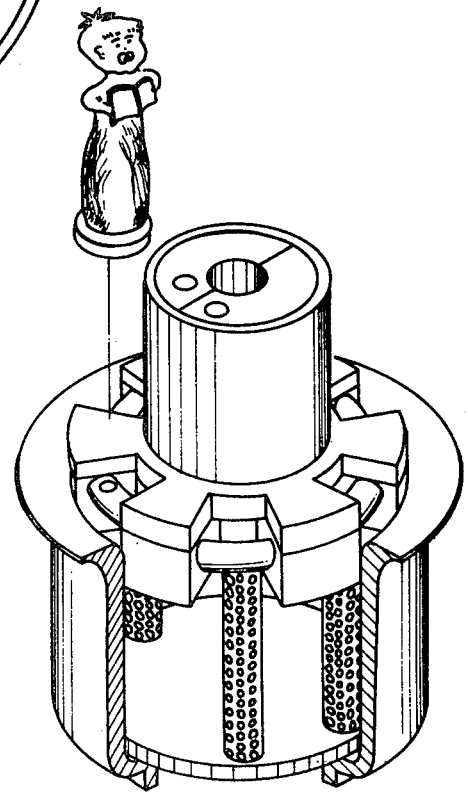
FIG. 2 is a perspective view of the same, wherein the lower pot is partially dismantled to reveal the internal structure.
Figure 5:
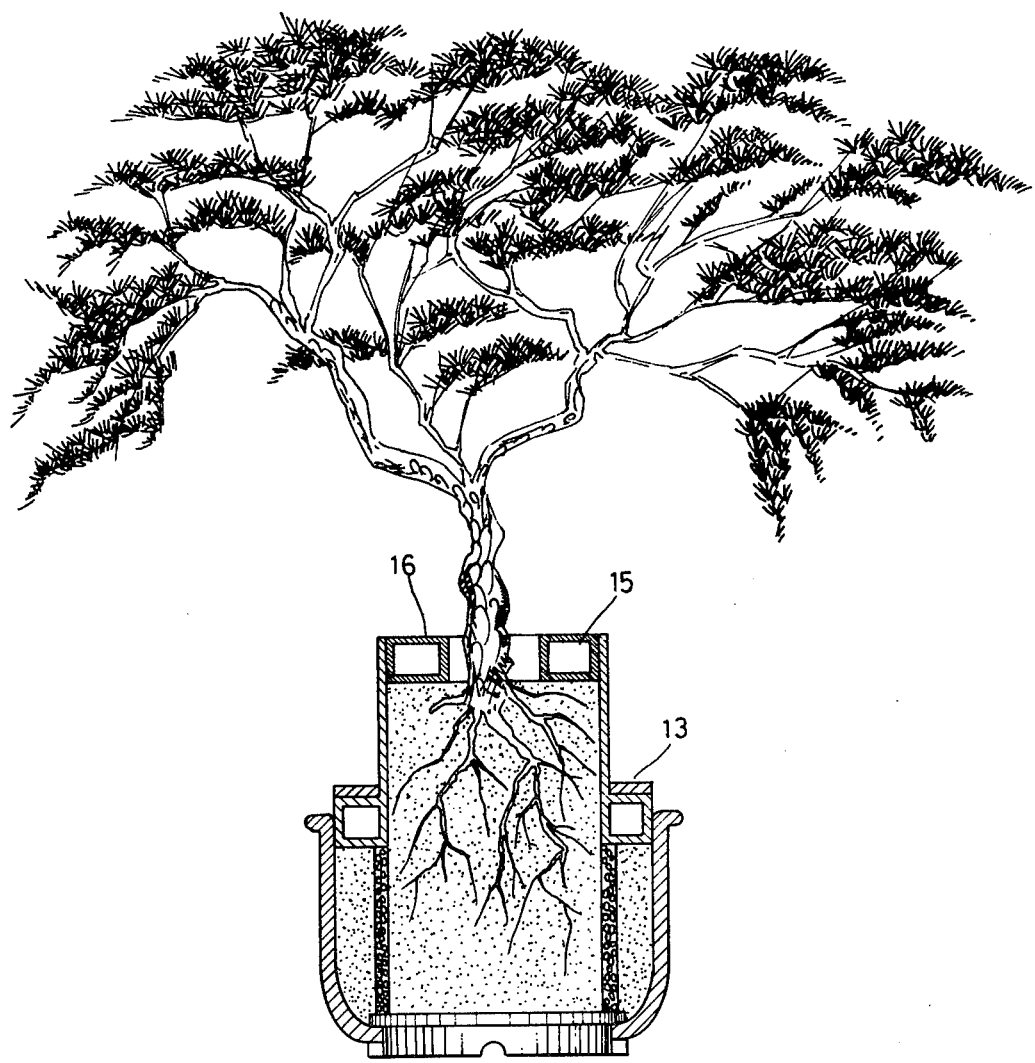
FIG. 5 is a sectional view of this invention.

With reference now to the drawings, particularly FIG. 1 thereof, this invention comprises upper pot (12). Lower pot (11), shield (13) and reservoirs (15), (16).

The bottomless upper pot (12) is supported above the drainage hole cover (124) through a plurality of hollow perforated columns (123) on which there are spread many perforations (123a). The cover serves to close the drainage hole (112). The lower end of each column is open to atmosphere while each upper end thereof is blind. From the vicinity of the base of upper pot (12), there are externally provided a plurality of reservoir stands (122) at the same level extending radially to the brim of lower pot (11). Thus these reservoir stands are inscribed in the inner side of the lower pot. The reservoir stands (122) are intercommunicated by a circular water conduit, on which there is a water inlet (122a) for the introduction of water. The blind upper end of the columns are attached to the conduit but are not in communication therewith. The top sides (112b) of all the reservoir stands (122), while at the same level, define a platform to receive an ornament (14), which thus stands out against the outer wall of the upper pot as background. The bottoms of the reservoir stands are water permeable to an extent. Water can exude from the reservoir stands (122) to moisten the soil. Shield (13) is laid on the reservoir stands (122), and comprises a plurality of radially extending projections (131) which are complementary to the top sides of the reservoir stands (122) so that by rotating the shield through an angle the exposed soil can be completely shielded against the raindrops. Two like hollow, split-ring (or semilunar) shaped reservoirs (15) (16), each having an inlet (17) for the introduction of water are provided. These bottoms are water permeable. The upper half of reservoir (15) is removed to show its structure. The diameter of reservoirs (15) (16) is such that they can be nested snugly into upper pot (12).

In use, mount the upper pot onto the lower pot with the drainage hole cover of the former covering the drainage hole of the latter. Then charge the space in the flower pot with culture soil and meantime, locate the plant. Fertilizer can be incorporated if desired. While watering the plant, fill up the reservoirs with water. Dilute fertilizer solution can be stored in the reservoir so that a small amount of fertilizer can be washed into the soil at each time of watering.

In case the stalk needs to be transplanted, it can be removed by means of pushing the drainage hole cover upward so as not to injure its root. If the plant anchors to the lower pot so tightly that the above measure doesn't work, then drive a thin, narrow blade of, for example, a tapering saw, into the interstice between the soil mass and the inner wall of lower pot, and make a round of cut along the inner wall of lower pot so that the soil mass can be detached from the wall. Then the stalk can be removed easily.

Various changes may be made in the embodiment of the invention herein specifically described without departing from or sacrificing any of the advantages of this invention or any features thereof, and nothing herein shall be construed as limitations upon this invention, its concept or structural embodiment as to the whole or any part thereof except as defined in the appended claims.

I claim:

1. A horticultural pot comprising:
    two coaxially positioned pots including a bottomless upper pot having smaller diametrical dimension and a lower pot having larger diametrical dimension with a drainage hole; the said upper pot being at a level where its lower edge is slightly below the top edge of said lower pot; around the lower part of said upper pot there being externally and peripherally provided a plurality of radially distributed, hollow structures to define first reservoir means for receiving water, and conduit means intercommunicating adjacent ones of said first reservoir means;

a drainage hole cover which closes said drainage hole;

a plurality of hollow columns supporting said first reservoir means and said upper pot; the lower end of each said column having an opening through said drainage hole cover and open to the outside, the upper end of each said column being blind; the side wall of each said column being densely provided with tiny perforations to communicate the interior of said column to the interior of said lower pot; at least part of the bottom of said first reservoir means being water-pervious; the top side of said reservoirs being substantially at the same level to define a platform.

2. The horticultural pot according to claim 1, further comprising second reservoir means which occupy an annular space at the upper end of said upper pot, the outer dimension of said annular space corresponding to the inner dimension of the upper end of said upper pot, said second reservoir means being divided into radially symmetrical, detachable segments, each segment being hollow and having its bottom pervious to water to an extent.

* * * * *